US007425961B2

(12) United States Patent
Tsukamoto

(10) Patent No.: US 7,425,961 B2
(45) Date of Patent: Sep. 16, 2008

(54) DISPLAY PANEL DRIVER UNIT

(75) Inventor: Akihito Tsukamoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 497 days.

(21) Appl. No.: 11/143,959

(22) Filed: Jun. 3, 2005

(65) Prior Publication Data

US 2005/0280653 A1 Dec. 22, 2005

(30) Foreign Application Priority Data

Jun. 3, 2004 (JP) ......................... P. 2004-165829

(51) Int. Cl.
*G06F 13/28* (2006.01)

(52) U.S. Cl. ....................... 345/533; 345/545; 345/558; 345/204; 345/571; 710/53; 710/57

(58) Field of Classification Search ......... 345/531-533, 345/558, 560, 565, 545, 204, 571; 710/52, 710/57

See application file for complete search history.

(56) References Cited

U.S. PATENT DOCUMENTS 6,789,175 B2 * 9/2004 Ryan et al. .................. 711/151
6,965,365 B2 * 11/2005 Nakamura ................... 345/87
2003/0222880 A1 * 12/2003 Waterman ................... 345/531
2004/0212624 A1 * 10/2004 Reynolds .................... 345/531

FOREIGN PATENT DOCUMENTS

JP 07-175445 7/1995

* cited by examiner

*Primary Examiner*—Kee M. Tung
*Assistant Examiner*—David H Chu
(74) *Attorney, Agent, or Firm*—McDermott Will & Emery LLP

(57) ABSTRACT

To provide an inexpensive display panel driver unit with a built-in memory, which is capable of achieving the same operation as that obtained in using a dual port memory by employing a single port RAM without reduction in an operation speed.

A reservation buffer 14 for storing an address and data in a memory writing is provided. When a display reading and a memory writing occurs simultaneously and row addresses of the memory writing and the display reading agree with each other, the memory writing is executed and also read data from addresses except a write address together with write data into the write address are used as data of the display reading. Also, when the row addresses of the memory writing and the display reading are different from each other, the write address and data are stored in the reservation buffer and also the display reading is executed. The similar mediation is applied in executing the reserved writing.

4 Claims, 18 Drawing Sheets

DISPLAY PANEL DRIVER UNIT

BACKGROUND OF THE INVENTION

1. Field of the Invention

The present invention relates to a display panel driver unit into which a frame memory for storing display data is incorporated.

2. Description of the Related Art

In the liquid crystal panel incorporated into the mobile equipment, there are some cases where such a configuration is employed that a host device always sends out display data to a source driver at a frame rate of the liquid crystal. Such host device has a screen memory therein, and sends out the data in a screen memory to the source driver at a frame rate of the liquid crystal based on DMA.

When employing such configuration, since a great deal of data must be sent out at a frame rate, power consumption generated due to output capacity of the host device, capacity of the wiring connected to the panel, input capacity of the panel, and so forth as one reason is increased. Also, in order to continue the display, at least the screen memory and a DMA controller in the host device must be kept in their operative condition. Thus, power consumption generated by this reason must be taken into consideration.

It is impossible to ignore such power consumption particularly in the equipment that is required to turn on the panel constantly. Therefore, the liquid crystal panel that has a built-in memory on the source driver side and then employs a source driver of the type that rewrites data in the memory from the host device only when update of the screen occurs was put to practical use (for example, see JP-A-7-175445 (page 18, FIG. 1)).

In such display panel driver unit, there is a probability that the writing into the built-in memory to update the screen and the reading to display occur simultaneously. Therefore, a dual port memory having two-system word lines and bit lines is employed not to reduce an operation speed.

FIG. 16 is a block diagram showing a configurative example of a display panel driver unit in the prior art. In FIG. 16, the display panel driver unit is constructed, centering on a dual port memory block 43 that is able to read each row of the display screen collectively.

One port of the dual port memory block 43 is formed to read the data in one line of the panel at a time. A discharge circuit 44 and a latch circuit 48 are connected to the bit lines of this port, and the data being read from the memory into the latch circuit 48 are converted into analog signals by DACs 1.

The other port of the dual port memory block 43 is provided to load the data from the host. A precharge circuit 4, a bit line driving circuit 6, and a column selector 7 are connected to the bit lines of this port.

FIG. 17 is a circuit diagram showing detailed configurations of the dual port memory block 43, the discharge circuit 44, the latch circuit 48, the bit line driving circuit 6, and the precharge circuit 4 for one bit.

As shown in FIG. 17, in addition to the normal configuration that consists of switch transistors 62 and 63 and inverters 64 and 65, the memory cell has read-only switch transistors 82 and 83. A large number of the memory cells being aligned in a vertically and horizontally constitute the dual port memory block 43 in FIG. 16.

Then, precharge transistors 66 and 67 and a bit line driving buffer 69 are connected to bit lines HOST_BLx and # HOST-_BLx of the host-side port. A large number of these elements being aligned constitute the precharge circuit 4 and the bit line driving circuit 6 in FIG. 16.

The bit line driving buffer 69 is provided to transfer the write data HOST_WD to the bit line, and drives HOST_BLx in same polarity as the HOST_WD and # HOST_BLx in opposite polarity to the HOST_WD respectively when an enable signal HOST_BEx goes to '1'. Then, both outputs are brought into their high-resistance state when the enable signal HOST_BEx goes to '0'.

The precharge transistors 66 and 67 are provided to fix electric potentials of two bit lines when the output of the bit line driving buffer 69 is in its high-resistance state, and are turned ON to set two bit lines to '1' when a precharge signal #HOST_PC goes to '0'.

In order to access this memory cell, at first a precharge condition is released by setting #HOST_PC to '1'. Then, the switch transistors 62 and 63 are turned ON by setting a host-side word line HOST_WLy to '1'. Thus, respective states of the inverters 64 and 65 constituting the latch appear on two word lines. Read data are given by outputting the states to the column selector 7.

Also, when HOST_BLx and #HOST_BLx are driven from HOST_WD via the bit line driving buffer 69 by setting HOST_BEx to '1' in the above condition, the inverters 64 and 65 are forced into the state of the bit line and thus the data writing is executed.

Meanwhile, a discharge transistor 81 and a latch 84 are connected to a bit line LCD_BLx of the display-side port. A large number of these elements being aligned constitute the discharge circuit 44 and the latch circuit 48 in FIG. 16.

This bit line is fixed to '0' because the discharge transistor 81 is kept in its ON state when the reading is not being executed. In reading, first a discharge signal LCD_DC is set to '0', and then a word line #LCD_WLy is set to '0' to bring the switch transistor 83 into its ON state.

When '0' is written into the memory cell at this time, the output of the inverter 64 becomes '1' and thus the transistor 82 is in its OFF state. Therefore, the bit line LCD_BLx is kept in its '0' state in a certain time. The latch 84 captures this state and thus '0' is read out.

Also, when '1' is written into the memory cell, the output of the inverter 64 becomes '0' and thus the transistor 82 is in its ON state. Therefore, '1' appears on the bit line LCD_BLx. The latch 84 captures this state and thus '1' is read out.

Next, an operation of the display panel driver unit in FIG. 16 will be explained based on the circuit operations explained as above. First, signals required for a display reading operation are generated by a display-system control pulse generator circuit 45 and a line counter 9 and a row decoder 42 both being controlled by an output of the display-system control pulse generator circuit 45.

FIG. 18 is a time chart showing waveforms of the display reading operation. In FIG. 18, all circuits are operated on the basis of a horizontal synchronization clock LCLK. That is, various reference signals are output from the display-system control pulse generator circuit 45 by using a trailing edge of LCLK as a starting point.

Also, the output of the line counter 9 is changed based on a leading edge of LCLK. A word line #LCD_WLv corresponding to this output value v is driven, and the data stored in the memory cell appears on the bit line LCD_BLx. The latch 84 stores this data.

Then, signals required to execute the writing from the host are generated from a host-access control pulse generator circuit 47 operated based on signals #CS, #WE, #OE, and an address A fed from the host, and an address counter 11, a row decoder 41, and a column decoder 17.

Here, the address A fed from the host denotes a register address, and a memory address is generated from the address counter 11. An initial value of the address counter 11 is set previously by the host before starting of the writing. Then, the row decoder 41 selects the concerned word line based on HOST_ROW that is a part of the output of the address counter 11, and also the column decoder 17 selects the concerned bit line based on HOST_COL.

FIG. 19 is a time chart showing waveforms of a writing operation from the host. The waveforms needed when three pixels are written in the lateral direction are shown herein, where m is an initial value of HOST_ROW and n is an initial value of HOST_COL.

A starting point of respective signals is a #WE signal, and a data latch 19 holds input data based on the #WE. Then, #HOST_PC becomes '1', and the precharge of the bit line HOST_BL is released. Then, when HOST_COL is n, a bit-line driving control signal HOST_BEn generated by the column decoder 17 goes to '1'. Therefore, the bit line driving circuit 6 drives a bit line HOST_BLn by the write data, and thus the data writing into the [m, n] address as the target is executed.

At this time, since bit-line driving control signals such as HOST_BEn+1, etc. are still kept in '0', the data stored in the memory cell appear merely on the bit lines such as HOST_BLn+1, etc.

Subsequently, the bit line HOST_BLn+1 is driven by the write data when HOST_COL is n+1, and thus the data writing into the [m, n+1] address is executed. Then, the bit line HOST_BLn+2 is driven by the write data when HOST_COL is n+2, and thus the data writing into the [m, n+2] address is executed.

With the above configuration, in the display panel driver unit having the built-in memory, the writing from the host and the display reading can be executed independently not to lower an operation speed.

The dual port memory having the conventional structure has such a fault that a circuit area is increased since eight transistors are needed every bit and also two-system bit lines and word lines are required.

In the normal LSI, it is feasible to suppress an increase of area by applying the fine process. However, in the display panel driver unit, there is the problem that it is difficult to apply the fine process because a withstand voltage is needed to output the analog signal at a voltage that is required for the panel.

SUMMARY OF THE INVENTION

The present invention has been made to overcome the problems in the prior art, and it is an object of the present invention to provide an inexpensive display panel driver unit with a built-in memory, capable of achieving the same operation as that obtained in using a dual port memory without reduction in an operation speed even when a single port RAM is employed.

A display panel driver unit of the present invention having a built-in memory that is able to read one line data of a display screen collectively in a display reading operation, comprises a reservation buffer for storing a write address and write data when a memory writing is generated from a host device of the memory, and a mediating means for executing mediation between the memory writing and the display reading, and execute mediation between the memory writing and the display reading as follows.

When the display reading and the memory writing occurs simultaneously and a row address of the memory writing agrees with a row address of the display reading, the mediating means executes the memory writing into the write address of the memory cell and also executes the display reading by reading the data from addresses of the memory cell except the write address and using the write data into the write address as read data from the write address.

When the display reading and the memory writing occurs simultaneously and the row address of the memory writing is different from the row address of the display reading, the mediating means stores the write address and the write data in the reservation buffer as a write reservation and also executes the display reading.

When the write address and the write data are stored in the reservation buffer as the write reservation and also the memory writing into a same row address as the write address for which the write reservation is made occurs, the mediating means executes simultaneously the memory writing occurred and the memory writing held by the write reservation collectively.

When the write address and the write data are stored in the reservation buffer as the write reservation and also the display reading from a same row address as the write address for which the write reservation is made occurs, the mediating means executes the memory writing into the write address, for which the write reservation is made, of the memory cell and also executes the display reading by reading the data from write addresses of the memory cell except the write address for which the write reservation is made and using the write data into the write address, for which the write reservation is made, as read data from the write address for which the write reservation is made.

In the present invention, the reservation buffer is constructed by a FIFO memory that stores the row address and a column address of the memory writing and the write data, and the row address of the display reading or the row address of the memory writing is compared with the row address being output from the FIFO memory to decide whether or not the write reservation is made.

In the present invention, the reservation buffer includes a register buffer for inputting the row address of the display reading or the row address of the memory writing and then outputting a presence or absence of the write reservation, and a reservation memory for storing the column address of the memory writing and the write data by receiving the row address of the display reading or the row address of the memory writing as an input.

In the present invention, the memory includes memory cells arranged vertically and horizontally and designated by the row address and the column address, bit lines from which the data of the memory cells are read in response to the row address in the display reading and the memory writing, a precharge circuit for setting the bit lines to a fixed electric potential as occasion demands, a first bit-line driving circuit for driving the bit line of the memory cell having the column address in response to the memory writing occurred, and a second first bit-line driving circuit for driving the bit line of the memory cell having the column address in response to the memory writing for which the write reservation is made.

Next, the principle of display reading and memory writing of the present invention in the above configuration will be explained hereunder. Since the memory of the type that basically each row of the display screen is read collectively is employed, the display reading is carried out only once in a horizontal period. For this reason, the mediation between the display reading and the memory writing must be considered only for an about one-several hundredths period out of the horizontal period, and thus the remaining period can be allocated to the writing.

First, in case the display reading in a [v] row and the writing into a [v, n] address occur simultaneously, the writing into the [v, n] address is executed by making the word line in a [v] row and the bit line in a [n] column active, as shown in FIG. 3. At this time, since the write data are transferred to the bit line in the [n] column and the already-stored data are transferred to the bit lines in other columns, these data may be handled collectively as the read data of the display.

Then, in case the display reading in the [v] row and the writing into a [m, n] address occur simultaneously, the reading in the [v] row is executed and also address information and write data are stored in a reservation buffer to reserve the writing in the [m, n] address, as shown in FIG. 4(1).

Then, in case the writing into a [m, n+1] address occurs, for example, the data are written into the same row as the row in which the data stored in the reservation buffer are written. Therefore, the address information and the write data are fetched from the reservation buffer, and then the writings into two addresses are executed simultaneously by making the bit lines in the [n] column and the [n+1] column active, as shown in FIG. 4(2).

Also, in case the display reading in a [m] row occurs after the write reservation shown in FIG. 4(1), the address information and the write data are fetched from the reservation buffer, and then the display reading in the [m] row and the writing into the [m, n] address are executed simultaneously by the same way as the foregoing method in the [y] row reading and the [y, n] address writing.

According to the above method, in case the writing into the row address that is different from the display reading occurs simultaneously with the display reading, the conditions are harshest. Therefore, if the reservation buffer has a memory capacity enough to store the data corresponding to the number of lines of the screen, i.e., the address information and the write data corresponding to the number of rows of the display memory, the display and the writing can be carried out without failure under the worst conditions.

The capacity in excess of the above is required in the situation that a screen update period, i.e., a memory rewrite period is shorter than a display period, i.e., a display reading period. However, this situation means the event that the screen contents are updated plural times while the data of one screen are displayed, and is without significance. Therefore, the capacity of the reservation buffer may be set to the capacity corresponding to the number of lines of the screen.

A difference in the total number of transistors required in this configuration is compared between the drivers having the memory that stores three primary colors RGB of the panel, which has vertical 320 pixels and horizontal 240 pixels, every six bits respectively, for example. First, if the dual port memory is applied, about eleven million transistors are needed in the prior art.

In contrast, if the single port memory is applied according to the above method, about eighty-three hundred thousand transistors are required for the memory and several hundred thousand transistors are required for the reservation buffer and the control circuit corresponding to vertical 320 pixels, and thus the nine million transistors are needed at the most. Therefore, the effect of reducing the two million transistors or more can be achieved.

According to the present invention, the single port memory constructed by two bit lines and one word line using six transistors can be employed in contrast to the case where the dual port memory cell constructed by three bit lines and two word lines using eight transistors is employed in the prior art. Therefore, the number of transistors can be reduced at least by 20%, and also one line is reduced from the word lines and the bit lines respectively. As a result, the inexpensive driver a circuit area of which is reduced can be provided.

DESCRIPTION OF THE PREFERRED EMBODIMENTS

Embodiment 1

Figure 1:
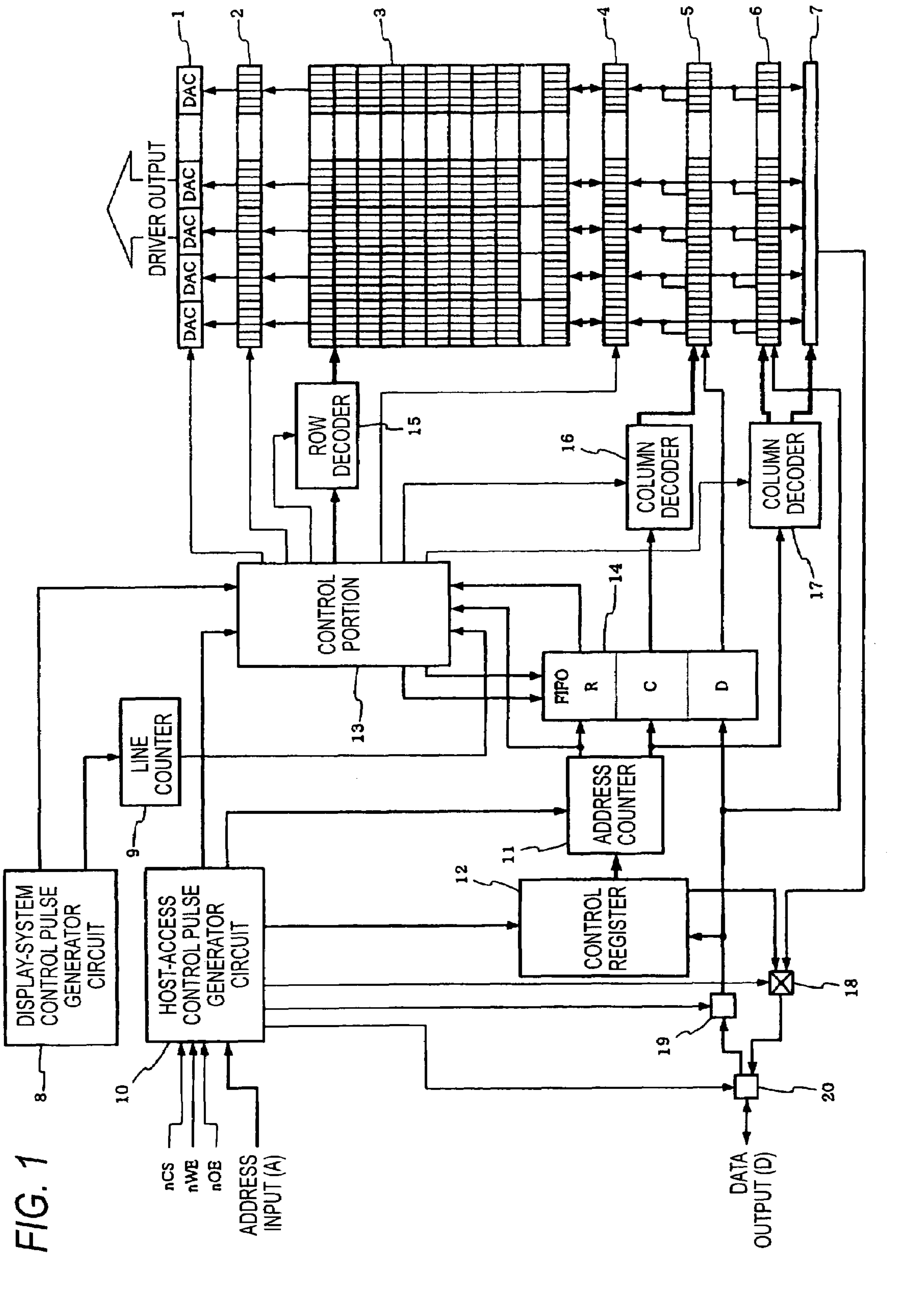
FIG. 1 is a block diagram showing a configuration of a display panel driver unit according to an embodiment 1 of the present invention.

Embodiments of the present invention will be explained in detail with reference to the drawings hereinafter. FIG. 1 is a block diagram showing a configuration of a display panel driver unit according to an embodiment 1 of the present invention. In FIG. 1, the display panel driver unit is constructed, centering on a single port memory block 3 that is able to read each row of the display screen collectively.

A register 2, the precharge circuit 4, bit line driving circuits 5, 6, and the column selector 7 are connected to the bit line of the single port memory block 3. Then, an output of the register 2 is converted into an analogue signal by the DACs 1, and is connected to the display panel.

Figure 2:
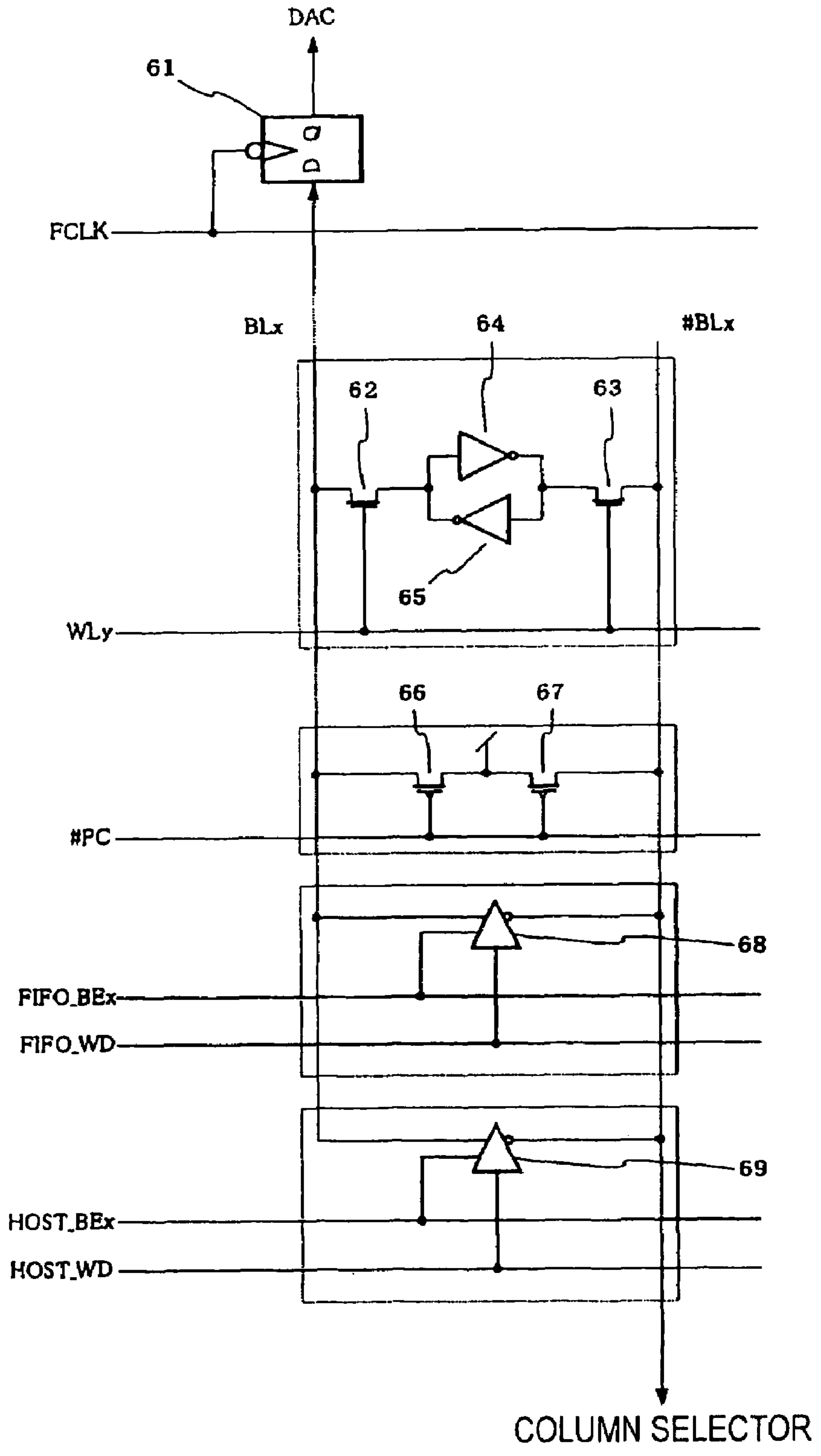
FIG. 2 is a circuit diagram showing a detailed configuration of a memory portion in the display panel driver unit in the embodiment 1.
Figure 3:
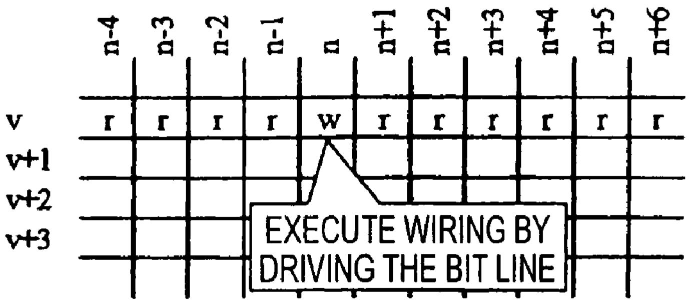
FIG. 3 is a view explaining the principle of memory reading and writing in the present invention.
Figure 4:
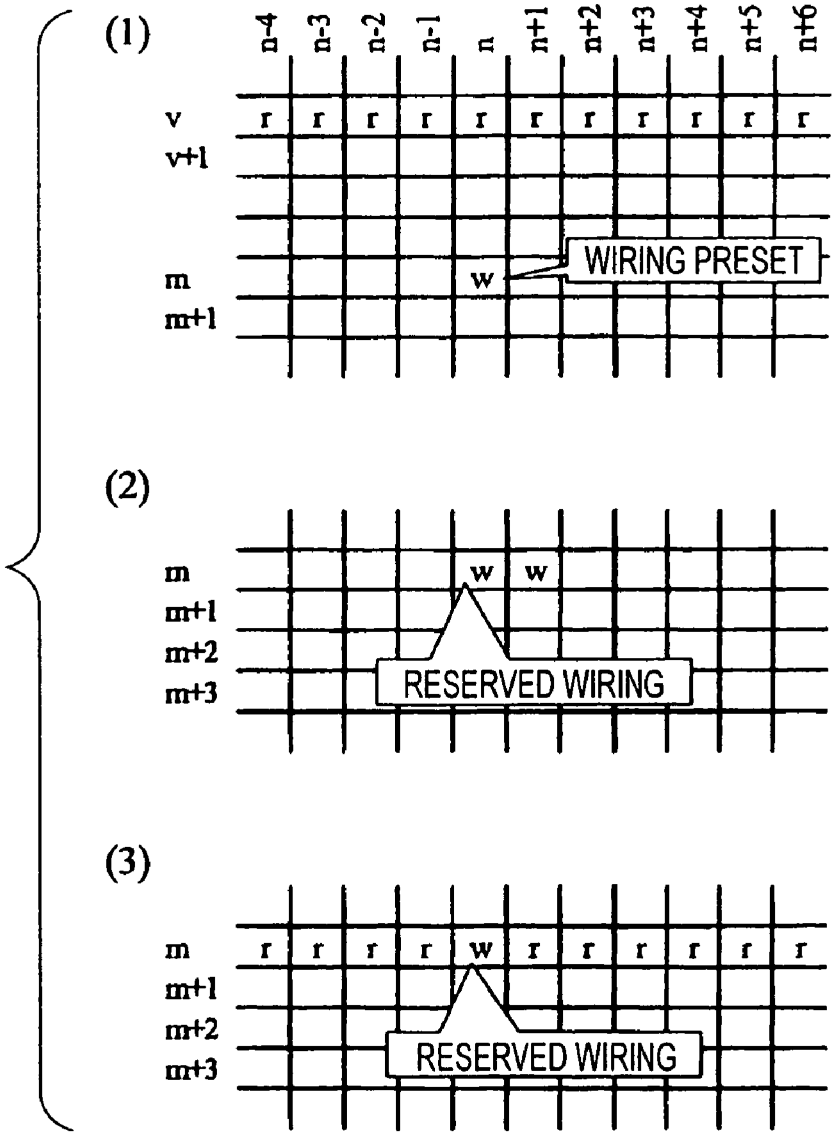
FIG. 4 is a view explaining the principle of memory reading and writing in the present invention.

FIG. 2 is a circuit diagram showing detailed configurations of the single port memory block 3, the precharge circuit 4, and the bit line driving circuits 5 and 6 for one bit.

As shown in FIG. 2, the memory cell is the normal one that is constructed by the switch transistors 62 and 63, and the inverters 64 and 65. A large number of memory cells being arranged vertically and horizontally constitute the single port memory block 3 in FIG. 1.

Also, a bit line driving buffer 68 used to load the data from the FIFO, and the bit line driving buffer 69 used to load the data from the host are provided. A circuit in which a number of former buffers are aligned gives the bit line driving circuit 5 in FIG. 1, and a circuit in which a number of latter buffers are aligned gives the bit line driving circuit 6.

In addition, one bit line BLx is connected to a D flip-flop 61. The D flip-flop 61 is operated based on FCLK acting as a trigger. A circuit in which a number of D flip-flops 61 are aligned corresponds to the register 2 in FIG. 1. Also, the other bit line #BLx is connected to the column selector. In this case, the connection of these BLx and #BLx is given merely to keep the load balance between the bit lines, and thus any connection may be employed if the logical system is matched.

Next, an operation of the display panel driver unit in FIG. 1 will be explained based on the circuit configuration explained as above. In FIG. 1, a mediate circuit 13 mediates three sets of signals, i.e., an output of a display-system control pulse generator circuit 8 and an output of the line counter 9, an output of a host-access control pulse generator circuit 10 and a row address being output from the address counter 11, and a writing reserving row address stored in a FIFO 14.

A row decoder 15 decodes the row address from the mediate circuit 13, shapes the waveform based on a word line reference signal fed from the mediate circuit 13, and drives the word line of the single port memory block 3.

A column decoder 16 decodes the column address being output from the FIFO 14, and controls the bit line driving circuit 5. Then, the column decoder 17 decodes the column address being output from the address counter 11, and controls the bit line driving circuit 6.

The column selector 7 selects the bit line based on the column address that the address counter 11 outputs. Normally, the column selector 7 is used to read the data in the memory inspection.

The interior of the FIFO 14 is divided roughly into three type areas of the row address, the column address, and the data. In this case, these three type areas are not operated individually and are operated simultaneously by a read/write signal from the mediate circuit 13. Also, the FIFO 14 has a signal to inform the mediate circuit 13 whether the data are accumulated in the inside or the inside is empty.

A control register 12 is used to set various operation parameters. The latch 19 temporarily stores the data given from the host. A selector 18 selects the data that are to be output. The data transfer to/from the host is executed via a bidirectional buffer 20.

Figure 5:
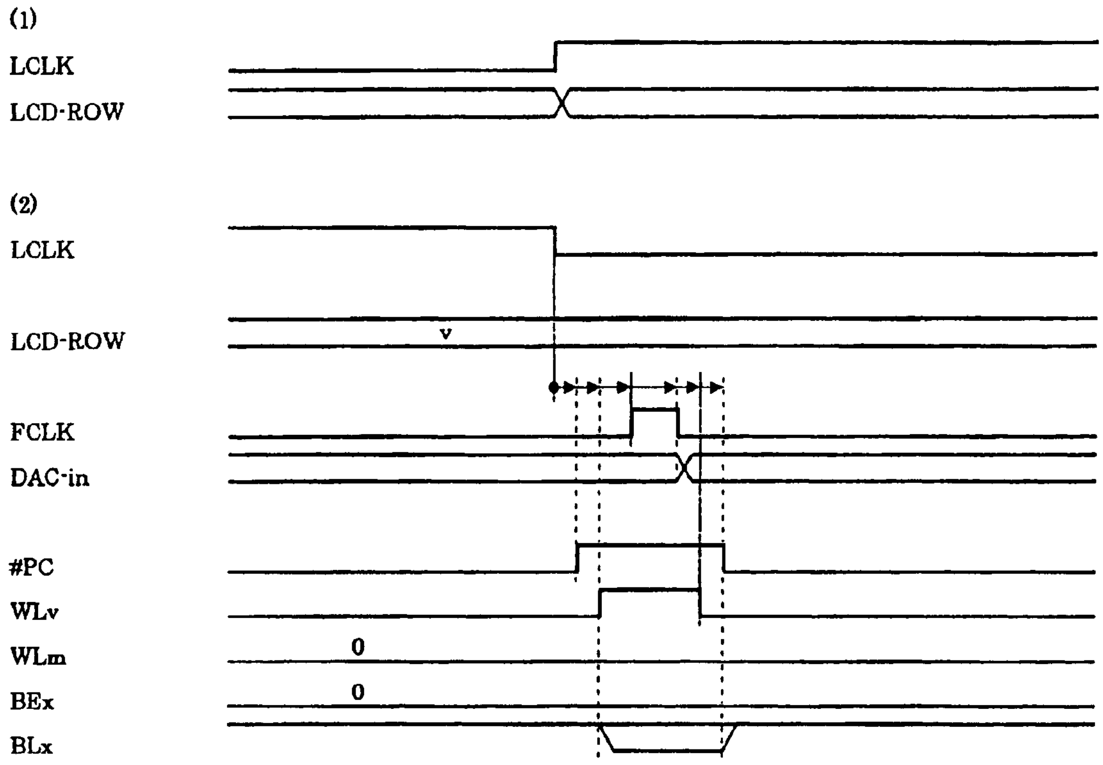
FIG. 5 is a time chart showing waveforms of a display reading operation in the display panel driver unit in the embodiment 1 when no writing is generated.

Next, an operation of the driver will be explained hereunder while showing waveforms in respective portions. FIG. 5 is a time chart showing waveforms of the display reading operation when no writing is generated from the host. As shown in FIG. 5(1), the line counter 9 is operated based on a clock LCLK acting as a trigger.

As shown in FIG. 5(2), various control signals of the memory are generated by using the trailing edge of LCLK as the starting point. At first, the precharge signal #PC goes to '1' and thus the precharge is released. Then, the word line WLv selected by the output value v of the line counter 9 goes to '1'. Accordingly, since the data of the memory cell selected by the word line WLv appear on all bit lines BLx, such data are fetched by the register 2 using FCLK as a clock and then are output as the data to the DACs 1.

Figure 6:
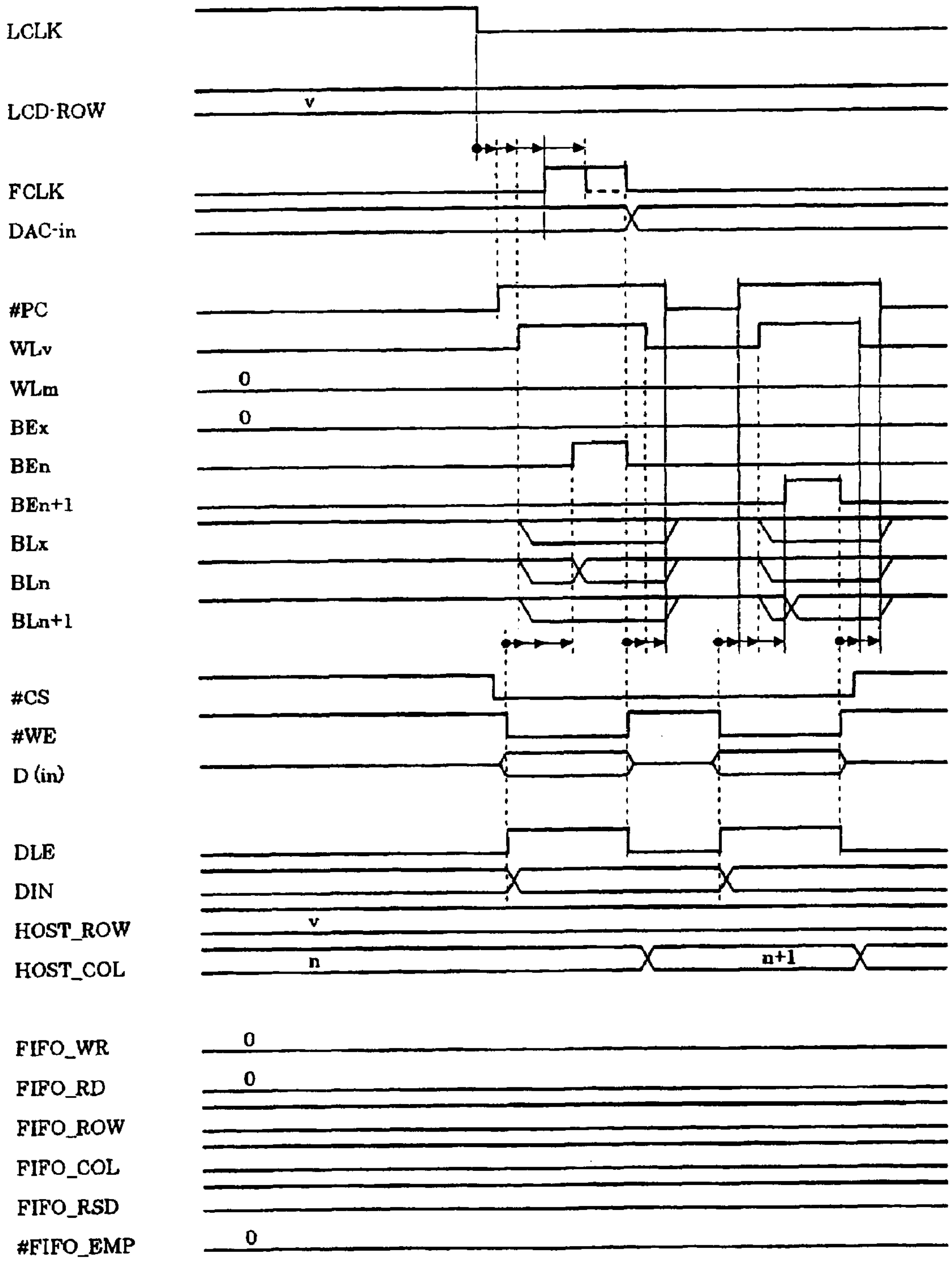
FIG. 6 is a time chart showing waveforms in the display panel driver unit in the embodiment 1 when writing in the same row and display reading are generated.

FIG. 6 is a time chart showing waveforms when the writing into the same row is generated after the display reading is started. At first, when the display reading is started by using the trailing edge of LCLK as the starting point, the precharge signal #PC goes to '1' and also the word line WLv is rendered active, like FIG. 5, and thus the data of the memory cell appear on the bit line BLx.

Here, when the writing into the [v, n+1] address occurs, the bit line driving signal BEn+1 goes to '1' and the bit lines BLn+1 and #BLn+1 are driven by the write data DIN. Accordingly, the write data DIN are written in the memory cell.

Since the data stored in the memory cell appeared on remaining bit lines, these data as well as the data on the bit line BLn+1 are fetched into the register 2 and then output as the data to the DACs 1. Normally FCLK should have a waveform indicated by a dotted line in FIG. 6, nevertheless such FCLK is extended in this case to have a waveform indicated by a solid line.

More particularly, when the writing into the same row is generated after the display reading is started, a timing at which the precharge signal #PC, the word line WL, and FCLK are changed from '0' to '1' respectively is decided by using the trailing edge of LCLK as the starting point. Also, a timing at which FCLK, the bit line driving control signal BE, the word line WL, and the precharge signal #PC are changed from '1' to '0' respectively is decided by using the leading edge of #WE as the starting point. In this manner, both the display reading and the writing operation into the same row generated after the reading is started are rendered compatible.

Figure 7:
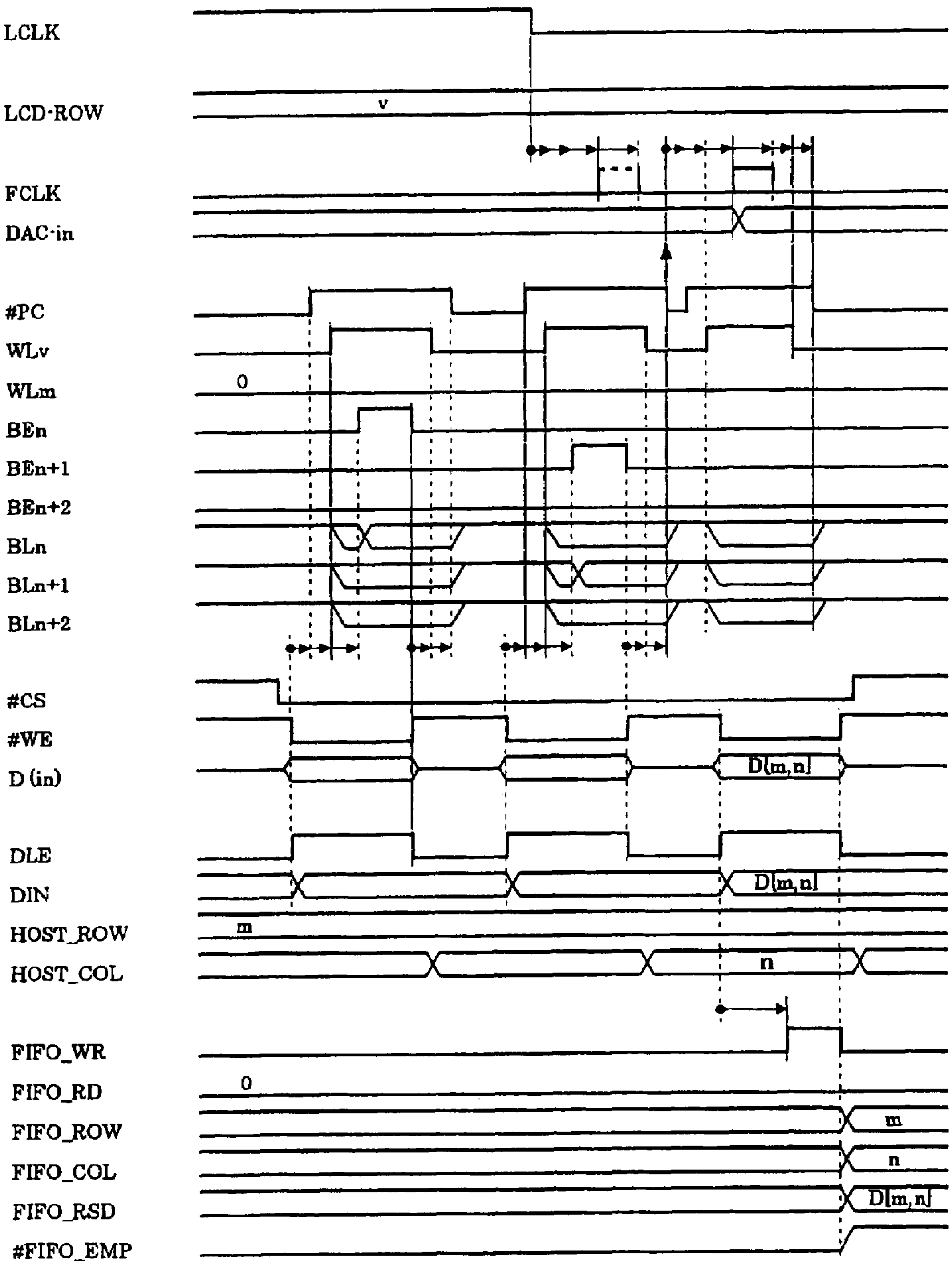
FIG. 7 is a time chart showing waveforms in the display panel driver unit in the embodiment 1 when writing in different rows and display reading are generated.

FIG. 7 is a time chart showing waveforms when the display reading in the [v] row is generated while the writing is executed continuously. Normally occurrence of the display reading is started at the trailing edge of LCLK, nevertheless the display reading in this case is made to wait until the second writing is completed. Then, the display reading operation is started by using a point of time when the precharge is started after this writing is completed as the starting point.

In contrast, as shown in FIG. 7, the writing into the [m, n] address occurs after the display reading is started. The writing address at this time is the [m] row, and is different from the [v] row as the display reading target. Therefore, this writing is reserved, and then [m], [n], and the write data D [m, n] from the host are stored in the FIFO. At this time, when the preceding state of the FIFO is empty, #FIFO_EMP goes to '1', as shown in FIG. 7. Here, if the writing address is the [v] row, the same relationship as that shown in FIG. 6 applies in this case and therefore the writing into the memory cell may be executed simultaneously by driving the bit line.

Figure 8:
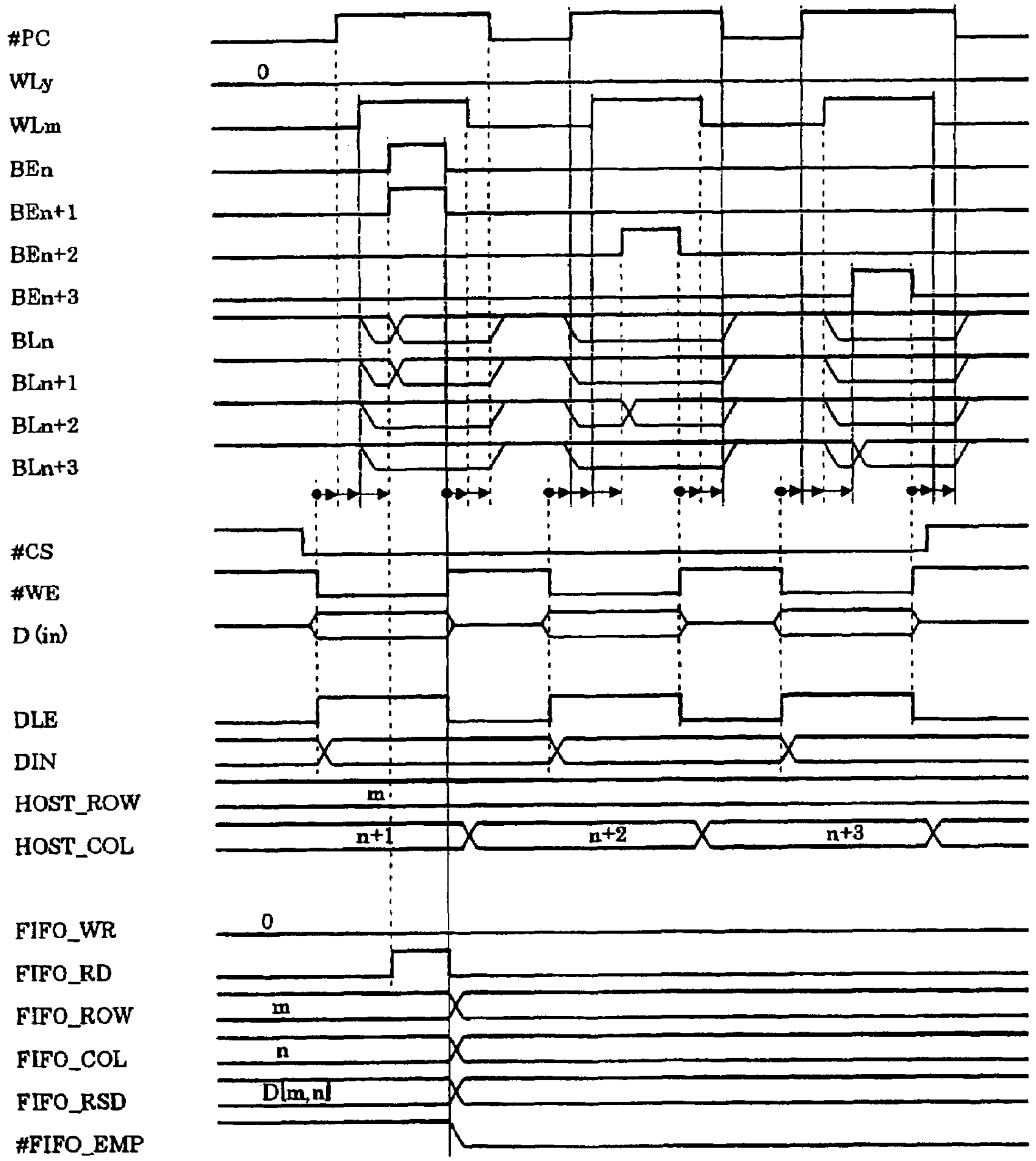
FIG. 8 is a time chart showing waveforms in the display panel driver unit in the embodiment 1 when reserved writing is executed simultaneously with the writing from a host.

FIG. 8 is a time chart showing waveforms when the writings into [m, n+1], [m, n+2], [m, n+3] addresses occur after the D [m, n] write reservation into the [m, n] address shown in FIG. 7 occurs.

In this case, when the writing into the [m, n+1] address is started, #FIFO_EMP goes to '1' and FIFO_ROW goes to [m]. From this information, it can be sensed that the write reservation for the [m] row into which the writing is started from now has already been made.

Therefore, in the writing into the [m, n+1] address, the bit-line driving control signals BEn+1 and BEn are turned to '1' simultaneously and the bit line BLn+1 is driven by the current write data DIN and at the same time the bit line BLn is driven by FIFO_RSD. Accordingly, the reserved writing is completed.

Also, the reading pulse RD is given to the FIFO to shift the data, and thus the next reserved data are output. If no subsequent data is present in the FIFO, #FIFO_EMP goes to '0' to indicate that the FIFO is empty, as shown in FIG. 8.

Figure 9:
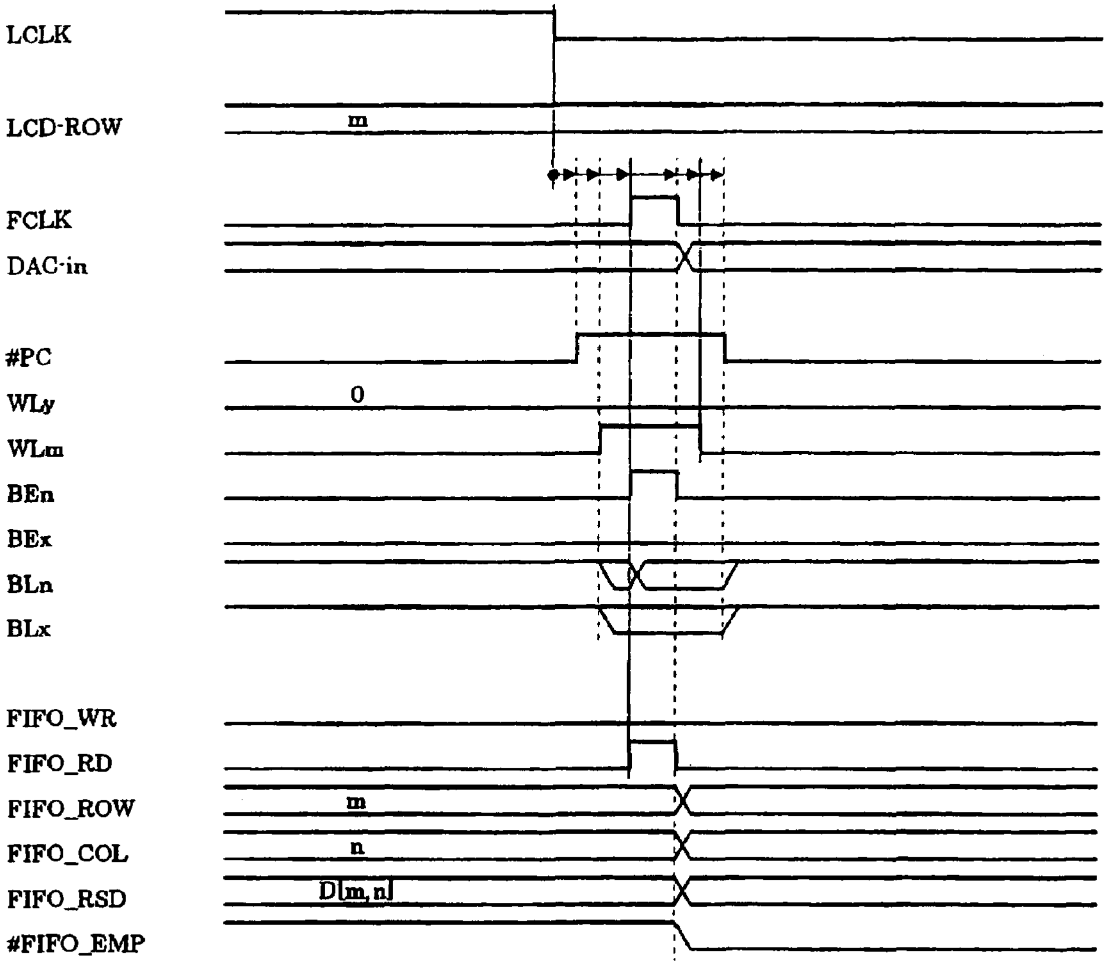
FIG. 9 is a time chart showing waveforms in the display panel driver unit in the embodiment 1 when the reserved writing is executed simultaneously with the display reading.

FIG. 9 is a time chart showing waveforms when the display reading in the [m] row occurs after the write reservation shown in FIG. 7. In this display reading, since #FIFO_EMP is '1' and FIFO_ROW is [m], it can be sensed that the write reservation for the [m] row from which the reading is started from now has already been made.

Therefore, the bit line BLn selected by FIFO_COL is driven by FIFO_RSD, and thus the reserved writing into the [m, n] address is completed. Also, since of course the word line WLm has already been '1', the data stored in the memory cell appear on other bit lines. As a result, if BEn is turned to '1' at the same timing as the clock FCLK of the register 2, the reserved write data D[m, n] together with the read data are fetched by the register 2. At this time, if no following data is present in the FIFO, #FIFO_EMP goes to '0' to indicate that the FIFO is empty, as shown in FIG. 9.

As described above, the reserved writing shown in FIG. 7 is written into the memory by the writing into the same row shown in FIG. 8 or the display reading from the same row shown in FIG. 9.

Embodiment 2

Figure 10:
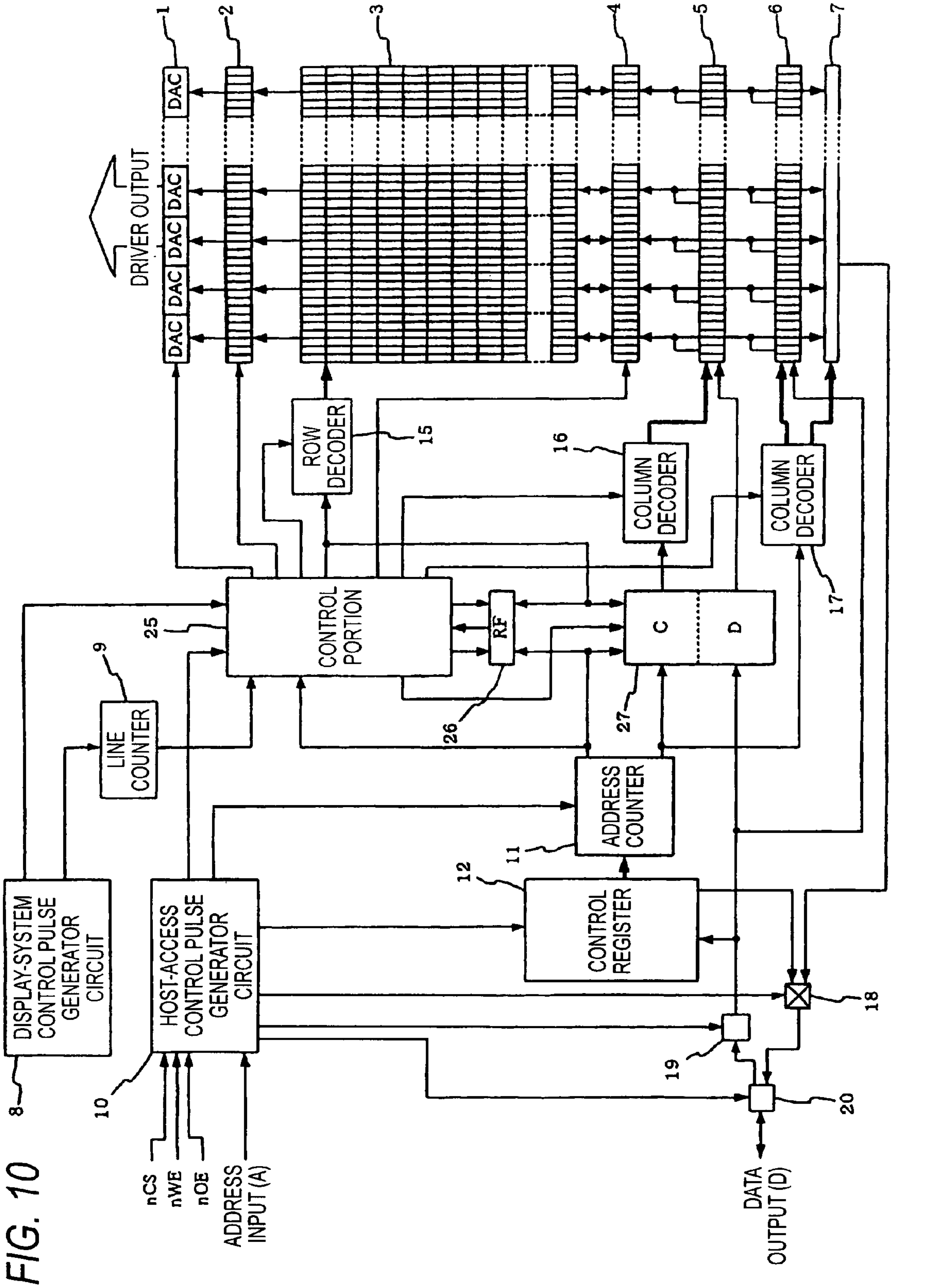
FIG. 10 is a block diagram showing a configuration of a display panel driver unit according to an embodiment 2 of the present invention.

FIG. 10 is a block diagram showing a configuration of a display panel driver unit according to an embodiment 2 of the present invention. In the present embodiment, the FIFO 14 used in the embodiment 1 is replaced with a register file 26 that stores the reservation bit to indicate whether or not the reservation is made, and a reservation memory 27 that stores the column address and the write data.

Here, the row address of the memory block 3 is used as the address of the register file 26 and the reservation memory 27. The reservation memory 27 consists of the dual port memory that has one writing port and one reading port and has a capacity of [the number of row addresses of the display memory]×[the bit number of row address+the bit number of write data].

Figure 11:
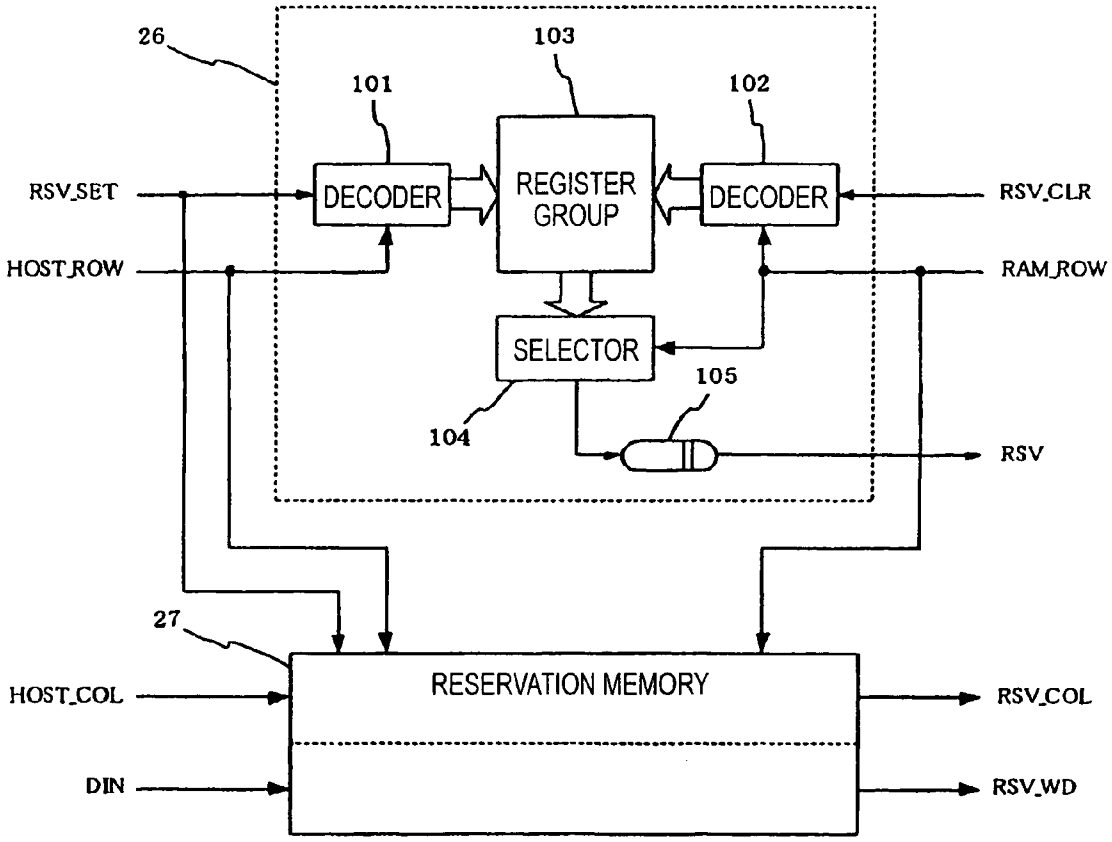
FIG. 11 is a block diagram showing configurations of a register file and a reservation memory for storing reservation bits in the display panel driver unit in the embodiment 2.

FIG. 11 is a block diagram showing configurations of the register file 26 and the reservation memory 27. In FIG. 11, RSV_SET and RSV_CLR are input from a mediate circuit 25. Also, HOST_ROW is the row address output from the address counter 11, and RAM_ROW is identical to the row address of the memory block 3.

When the RSV_SET pulse is given, the bit of the register file 26 designated by HOST_ROW goes to '1'. Thus, the column address HOST_COL and the write data DIN are written into the reservation memory 27.

Then, a reservation state signal RSV and a reservation column address RSV_COL and write data RSV_WD selected by RAM_ROW respectively are output from the register file 26 and the reservation memory 27. At this time, if the RSV_CLR pulse is given, the bit of the register 26 goes to '0' and the RSV output is changed later by a delay time of a delay element 105. In this case, the reason why RSV is caused to delay is to execute the reserved writing without fail, and details will be described later.

Figure 12:
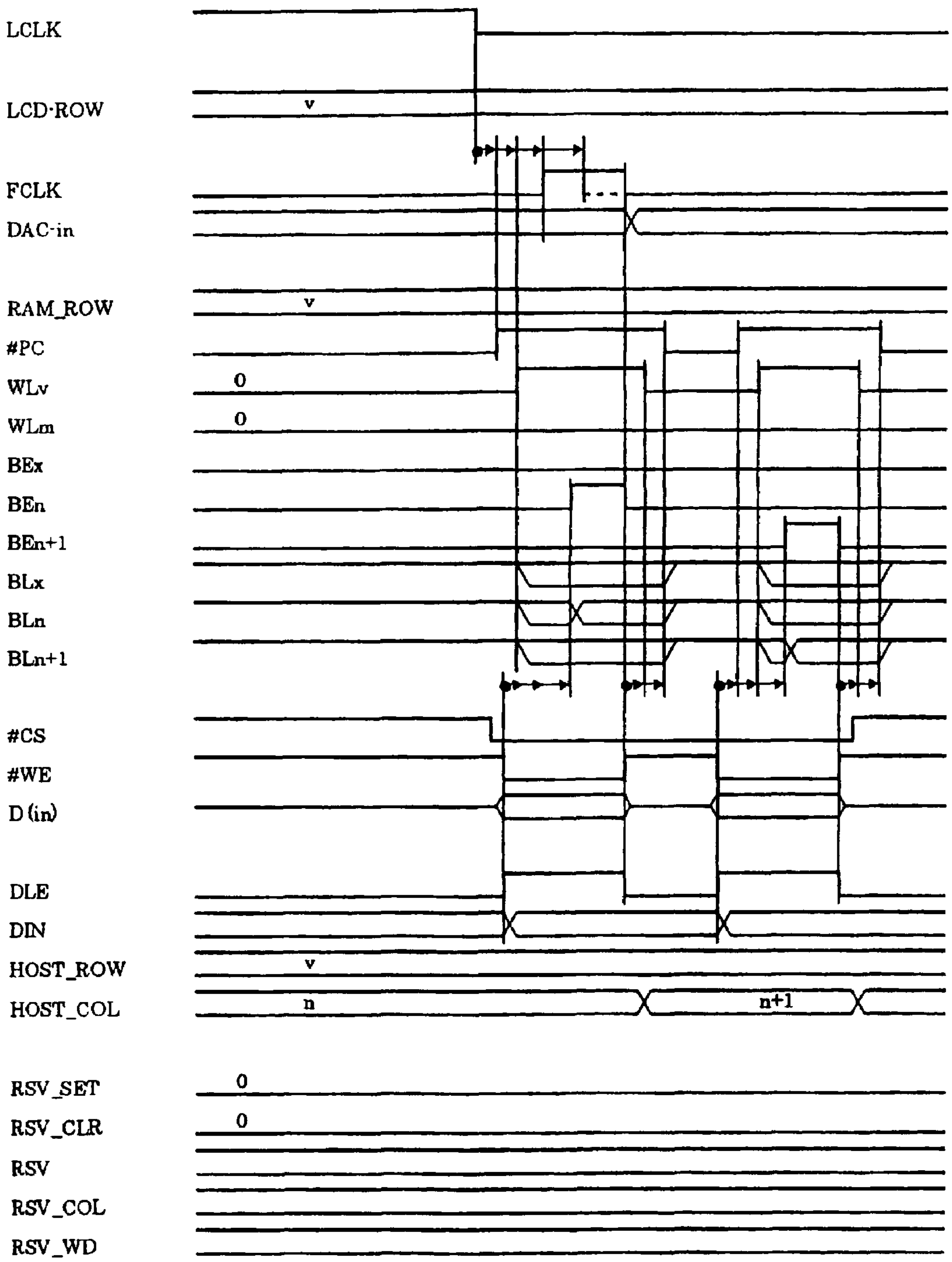
FIG. 12 is a time chart showing waveforms of a display reading operation in the display panel driver unit in the embodiment 2 when no writing is generated.

FIG. 12 is a time chart showing waveforms when the display reading and the writing from the host occur simultaneously in the same row. In this case, the writing and the reading of the memory block 3 are identical to the embodiment 1. Also, nothing happens in the register file 26 and the reservation memory 27.

Figure 13:
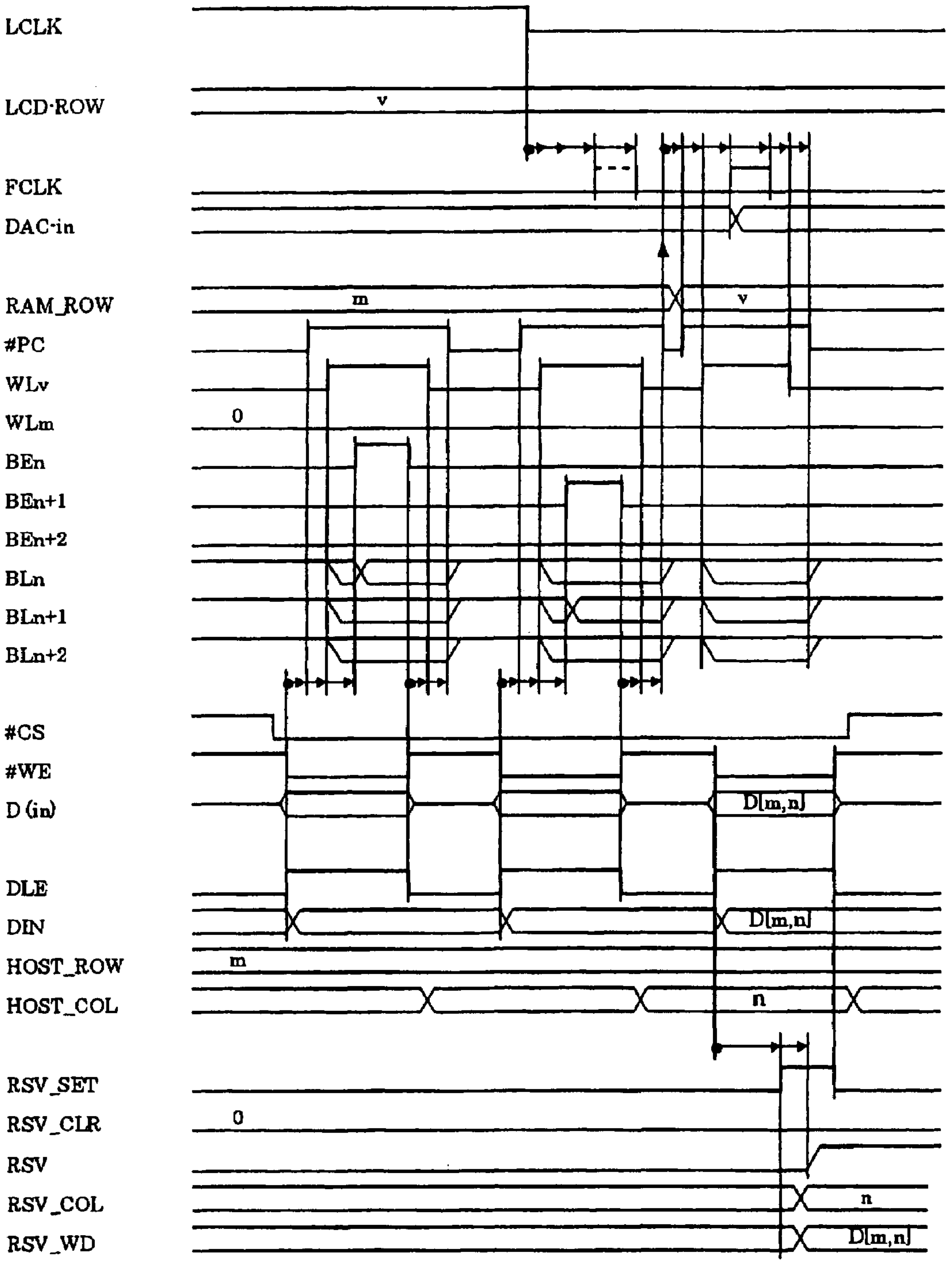
FIG. 13 is a time chart showing waveforms in the display panel driver unit in the embodiment 2 when the writing in different rows and the display reading are generated.

FIG. 13 is a time chart showing waveforms when the display reading in the [v] row occurs while the writing is executed successively. Normally generation of the display reading is started at a trailing edge of LCLK, but the display reading in this case is made to wait until the second writing is completed, like the embodiment 1. Then, the display reading operation is started at a point of time when the precharge is started after this writing is completed as the starting point.

In contrast, as shown in FIG. 13, the writing into the [m, n] address is generated after the display reading is started. The writing destination at this time is the [m] row and is different from the [v] row as the target of the display reading. Therefore, this writing is reserved. At this time, the data in the [m] address of the register file 26 goes to '1' in response to the RSV_SET signal output from the mediate circuit 25, and the column address n and the write data D[m, n] are written into the [m] address of the reservation memory 27.

Figure 14:
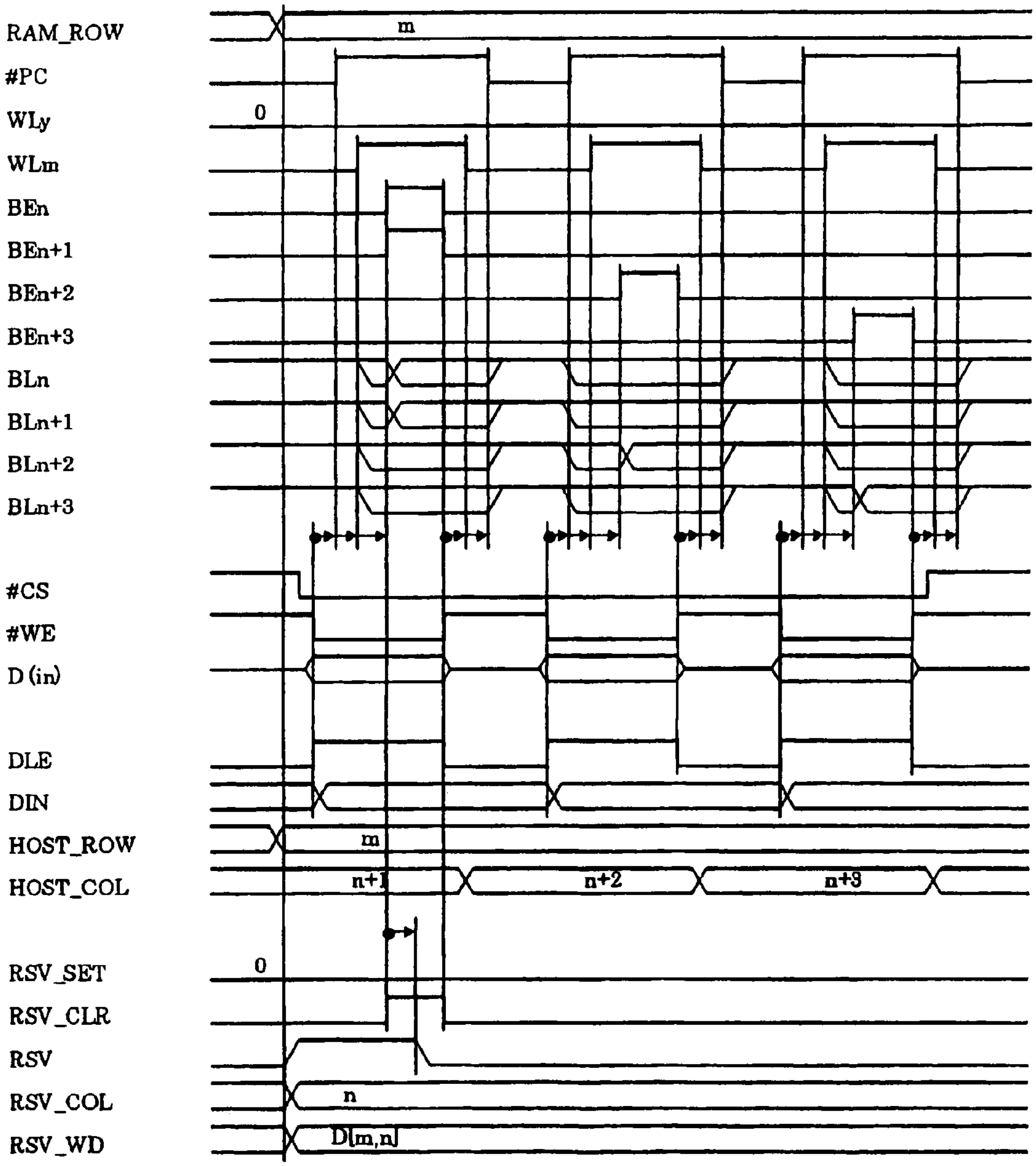
FIG. 14 is a time chart showing waveforms in the display panel driver unit in the embodiment 2 when reserved writing is executed simultaneously with the writing from the host.

FIG. 14 is a time chart showing waveforms when the writings into the [m, n+1], [m, n+2], [m, n+3] addresses occur after the D[m, n] write reservation to the [m, n] address shown in FIG. 13 is generated.

At this time, since RAM_ROW goes to m and the output RSV of the register file 26 is changed into '1', it can be sensed that the write reservation in the [m] row is made. Also, the output RSV_COL of the reservation memory 27 becomes n and RSV_WD becomes D[m, n]. Therefore, the bit-line driving control signals BEn as well as BEn+1 goes to '1', and the bit line BLn+1 is driven by the current write data DIN and simultaneously the bit line BLn is driven by RSV_WD.

Also, in order to clear the reserved condition at the same time as the bit line drive, the mediate circuit 25 generates the RSV_CLR pulse to set the [m] address of the register file to '0'. Therefore, RSV goes to '0', but a timing at which RSV goes to '0' is delayed by the delay element 105 to prevent the event that the drive starting of the bit line BLn is canceled.

Figure 15:
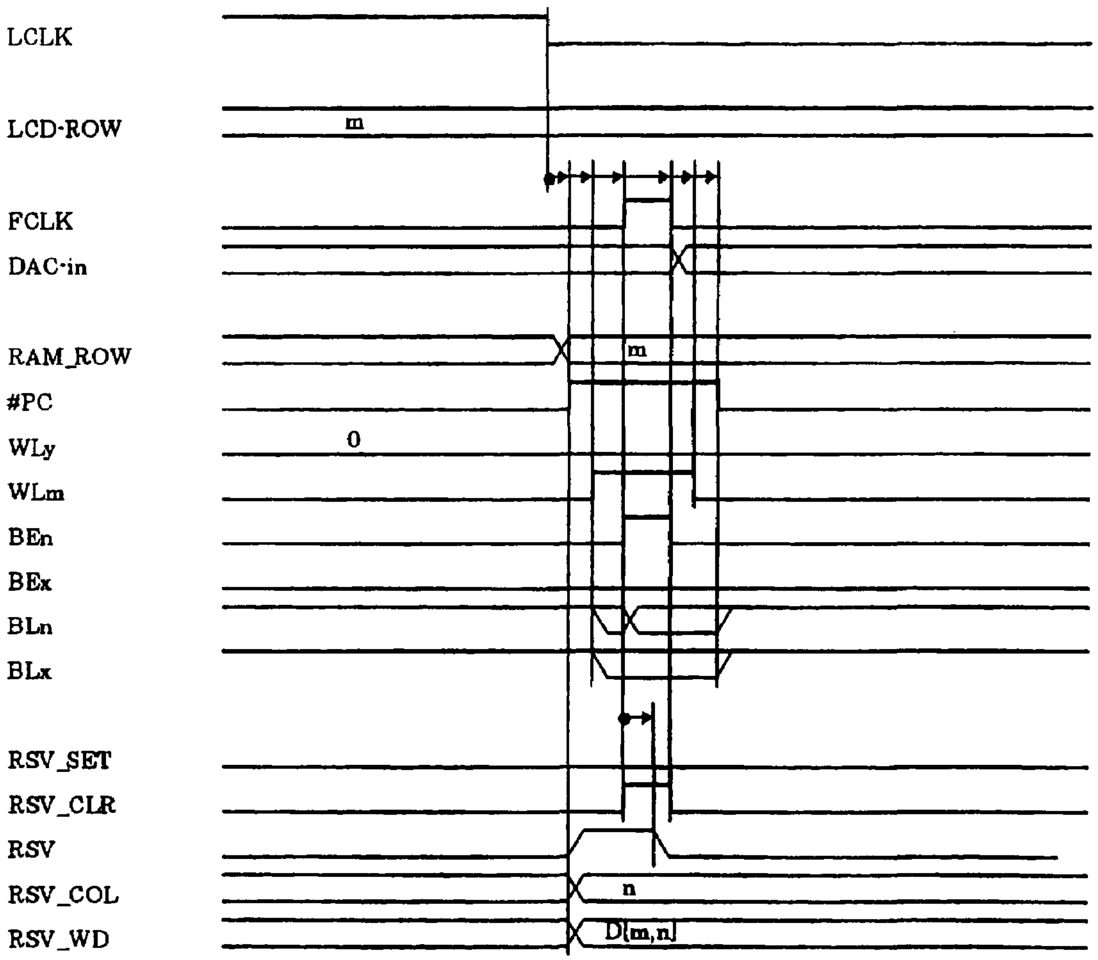
FIG. 15 is a time chart showing waveforms in the display panel driver unit in the embodiment 2 when the reserved writing is executed simultaneously with the display reading.
Figure 16:
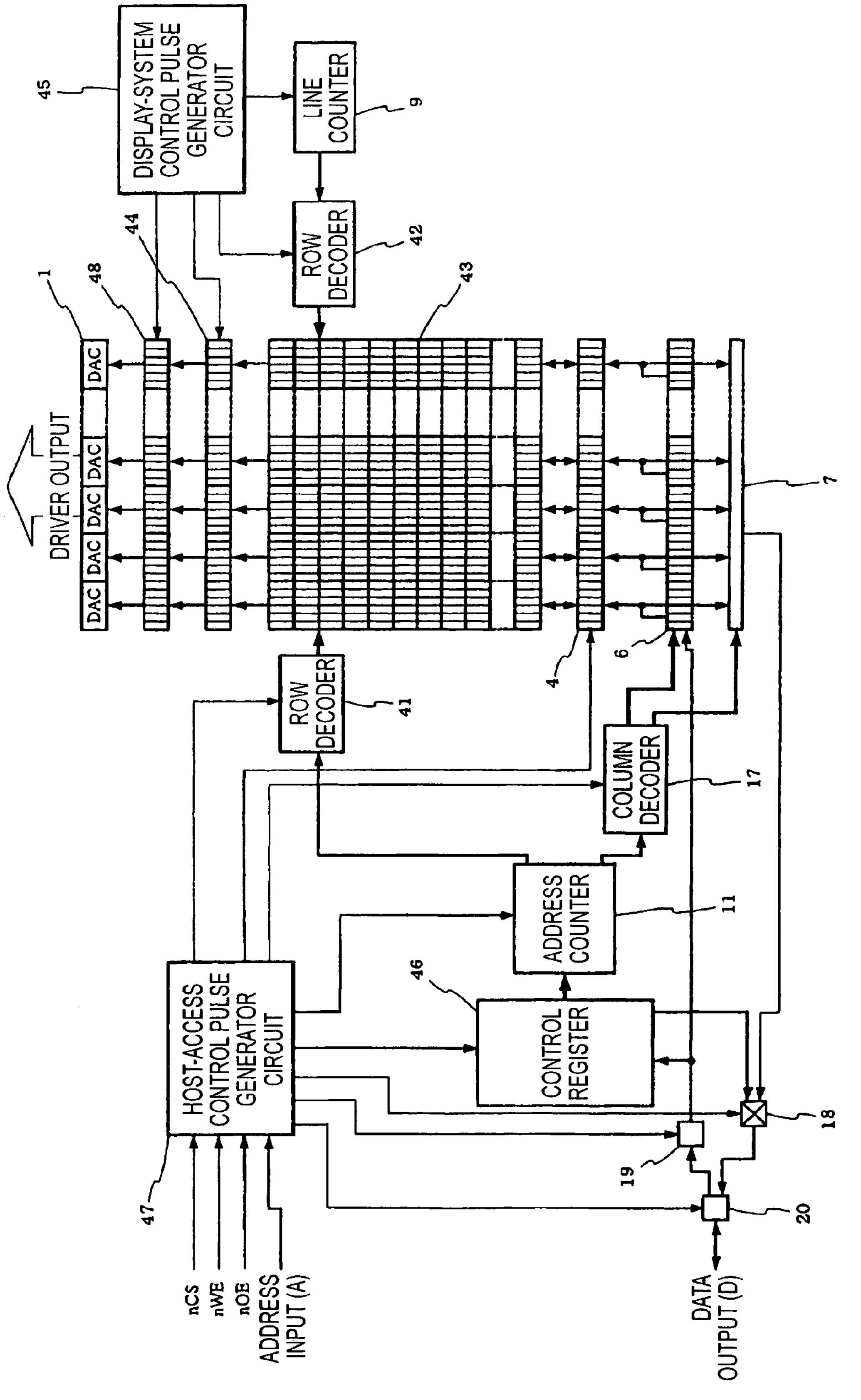
FIG. 16 is a block diagram showing a configurative example of a display panel driver unit in the prior art.
Figure 17:
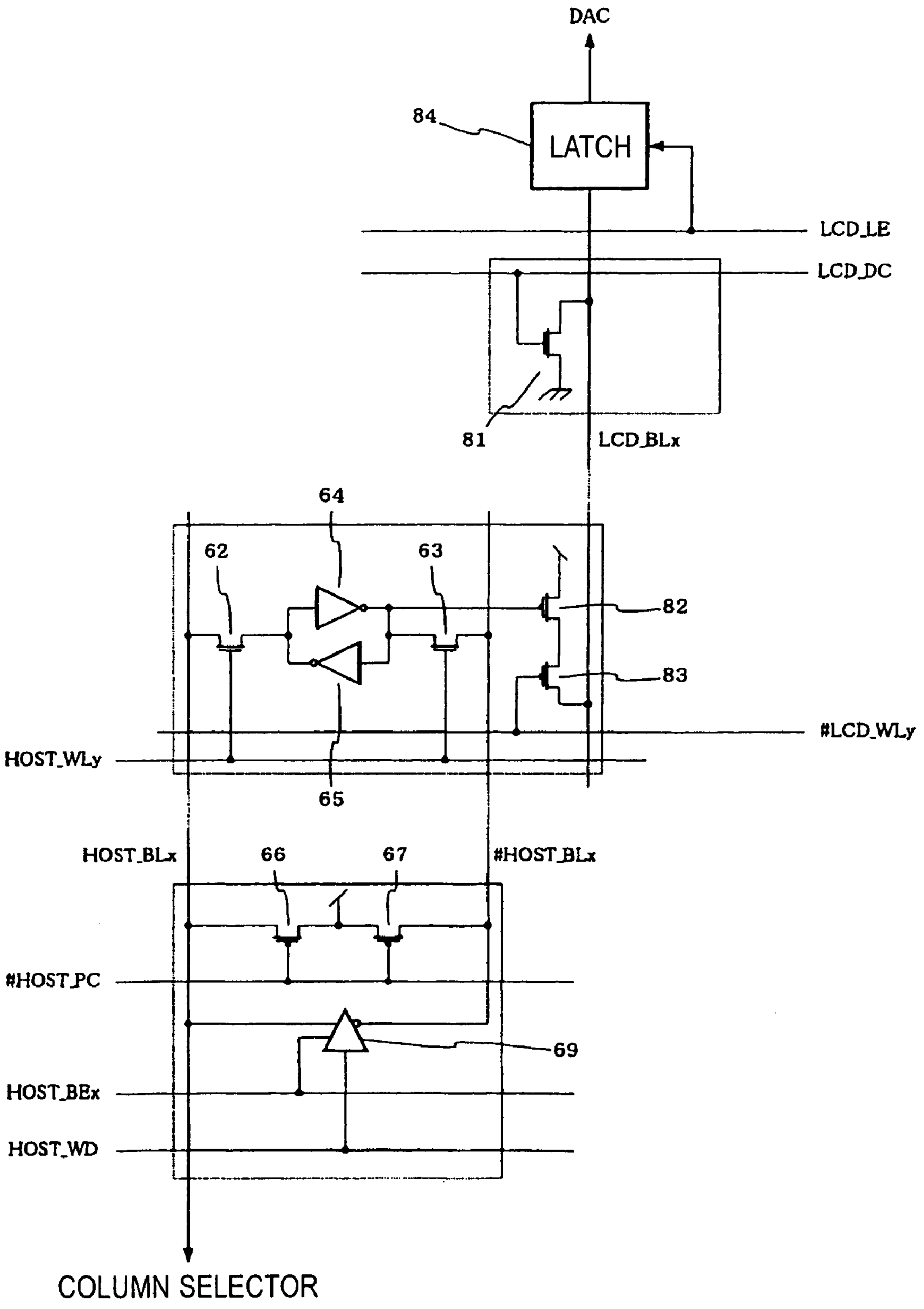
FIG. 17 is a circuit diagram showing a detailed configuration of a memory portion in the display panel driver unit in the prior art.
Figure 18:
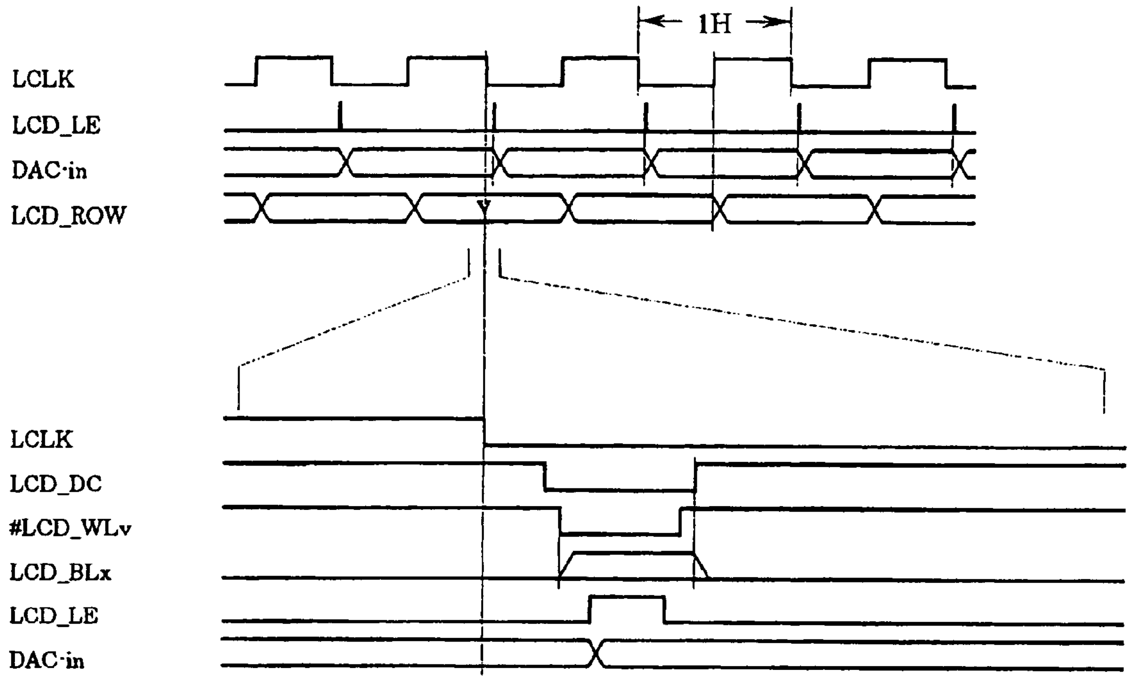
FIG. 18 is a time chart showing waveforms of a display reading operation in the display panel driver unit in the prior art.
Figure 19:
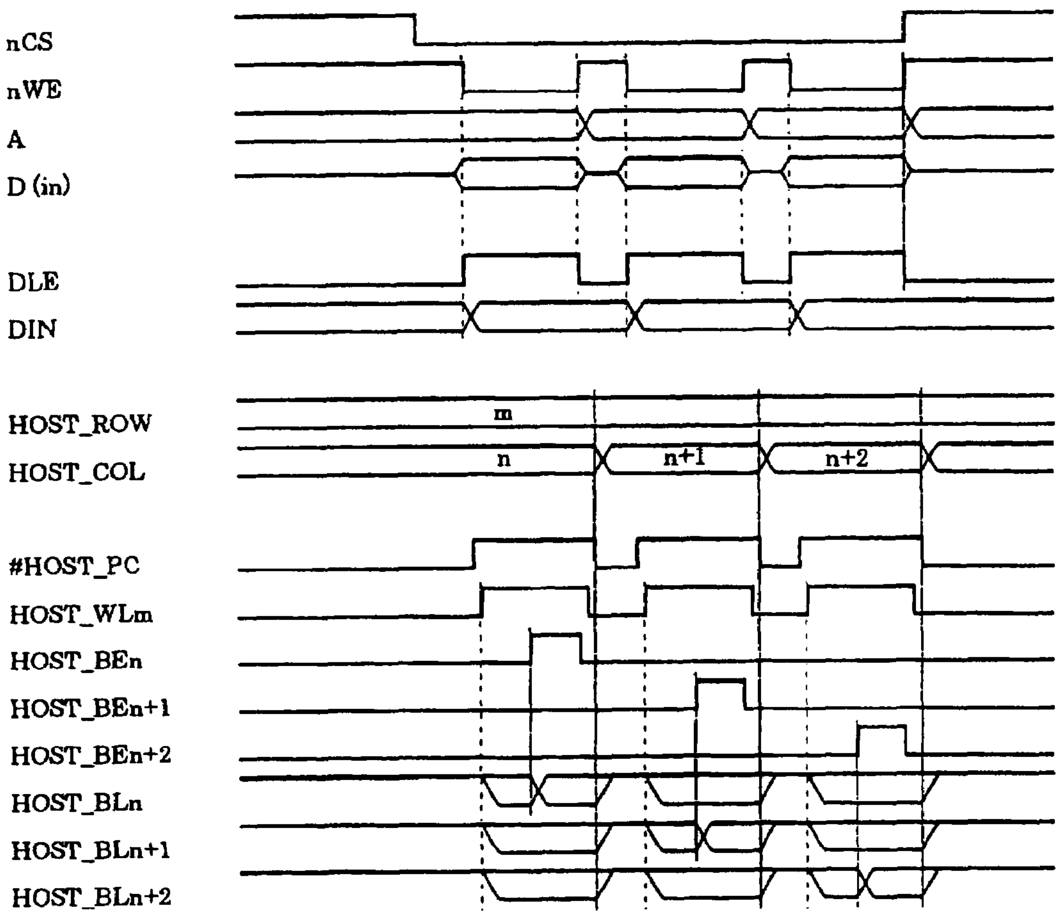
FIG. 19 is a time chart showing waveforms of a writing operation from the host in the display panel driver unit in the prior art.

FIG. 15 is a time chart showing waveforms when the display reading in the [m] row occurs after the write reservation shown in FIG. 13 is generated. Following upon the starting of the display reading, the row address of the memory block 3 goes to m and also the output RSV of the register file 26 goes to '1'. Thus, it can be sensed that the write reservation has been made.

At the same time, the row address RSV_COL output from the reservation memory 27 goes to n and the reservation data RSV_WD goes to D[m, n]. Then, the bit line BLn selected by RSV_COL is driven by RSV_WD. Also, like the case in FIG. 14, the RSV_CLR pulse is generated to clear the [m] address of the register file. It is similar to the case in FIG. 14 that the shifting of RSV to '0' is delayed.

With the above, the reserved writing shown in FIG. 13 is written into the memory by the writing into the same row shown in FIG. 14 or the display reading from the same row shown in FIG. 15.

Here, in the present embodiment, the reading sequence from the reservation buffer is not fixed. Therefore, no trouble is caused even if the operations of the line counter 9 and the address counter 11 are set in the adding direction or the subtracting direction. As a result, the present invention can be applied to the driver in which the addition and the subtraction are programmable.

The dual port memory cell that is constructed by using eight transistors to have three bit lines and two word lines is employed in the prior art, nevertheless the display panel driver unit of the present invention can employ the single port memory that is constructed by using six transistors to have two bit lines and one word line. Accordingly, the number of transistors can be reduced at least by 20%, and also one line is reduced from the word lines and the bit lines respectively. Therefore, the present invention can achieve the effect that is capable of supplying the inexpensive driver whose circuit area is reduced. The present invention is valuable for the display panel driver of the type that has the built-in memory and drives the panel elements by reading the data in one row of the display panel from the memory collectively, and others.

What is claimed is:

1. A display panel driver unit, having a built-in memory that is able to collectively read a row of memory cells at a plurality of addresses corresponding to the row, comprising:

a reservation buffer, storing a reservation, said reservation comprising a reserved write address and a reserved write data; and a mediator, executing mediation between a memory writing, with a corresponding write address, writing row address, and write data, generated from a host device and a display reading, with a corresponding reading row address; wherein, the display panel driver unit is adapted to simultaneously receive the write data and output a row of read data, when the display reading and the memory writing occur simultaneously and the writing row address is the same as the reading row address, the mediator executes the memory writing into the memory cells at the write address and also executes the display reading by reading the data from the memory cells at the reading row address except at the write address and using the write data as read data from the write address, when the display reading and the memory writing occur simultaneously and the writing row address is different from the reading row address, the mediator stores the write address and the write data in the reservation buffer as a reservation and also executes the display reading, when a memory writing occurs, a reservation is stored in the reservation buffer, the writing row address is the same as the row address corresponding to the reserved write address, and the reserved write address is not the same as the write address, the mediator in a collective operation stores the write data into the memory cells at the write address and stores the reserved write data into the memory cells at the reserved write address, and when a display reading occurs and a reservation is stored in the reservation buffer, and the reading row address is the same as the row address corresponding to the reserved write address, the mediator stores the reserved write data into the memory cells at the reserved write address, and also executes the display reading by reading the data from the memory cells at the reading row address except at the write address and using the reserved write data as read data from the reserved write address.

2. The display panel driver unit according to claim 1, wherein the reservation buffer is constructed by a FIFO memory that stores the row address and a column address of the memory writing and the write data, and the row address of the display reading or the row address of the memory writing is compared with the row address being output from the FIFO memory to decide whether or not the write reservation is made.

3. The display panel driver unit according to claim 1, wherein the reservation buffer includes:

a register buffer, for inputting the row address of the display reading or the row address of the memory writing and then outputting a presence or absence of the write reservation; and a reservation memory, for storing the column address of the memory writing and the write data by receiving the row address of the display reading or the row address of the memory writing as an input.

4. The display panel driver unit according to claim 1, wherein the memory includes memory cells arranged vertically and horizontally and designated by the row address and the column address, bit lines from which the data of the memory cells are read in response to the row address in the display reading and the memory writing, a precharge circuit for setting the bit lines to a fixed electric potential as occasion demands, a first bit-line driving circuit for driving the bit line of the memory cell having the column address in response to the memory writing occurred, and a second first bit-line driving circuit for driving the bit line of the memory cell having the column address in response to the memory writing for which the write reservation is made.

* * * * *